ANALOGUE TO DIGITAL CONVERTER AND COUNTER

Filed May 5, 1959 4 Sheets-Sheet 1

MAX EVERSON JONES,
INVENTOR.

HERZIG & JESSUP
ATTORNEYS.
By Warren V. Jessup

ANALOGUE TO DIGITAL CONVERTER AND COUNTER

Filed May 5, 1959 4 Sheets-Sheet 2

MAX EVERSON JONES,
INVENTOR.

HERZIG & JESSUP
ATTORNEYS.
By Warren T. Jessup

ANALOGUE TO DIGITAL CONVERTER AND COUNTER

Filed May 5, 1959 4 Sheets-Sheet 3

MAX EVERSON JONES,
INVENTOR.

HERZIG & JESSUP
By Warren T. Jessup
ATTORNEYS.

MAX EVERSON JONES,
INVENTOR.

HERZIG & JESSUP
ATTORNEYS
BY Warren T. Jessup

United States Patent Office 3,099,831
Patented July 30, 1963

3,099,831
ANALOGUE TO DIGITAL CONVERTER AND COUNTER

Max Everson Jones, Los Angeles, Calif., assignor to Crane Co., Chicago, Ill., a corporation of Illinois Filed May 5, 1959, Ser. No. 811,215
5 Claims. (Cl. 340—347)

This invention relates to apparatus for indicating electrically the position of a rotary member and more particularly, for indicating such position in a binary system of indication. This apparatus is therefore in that class of equipment which has come to be known as analogue to digital converters.

It is an object of this invention to provide an analogue to digital converter which is more precise in its indication than prior devices—that is to say, one in which a greater number of output indications or pulses are delivered for a given angular displacement of the rotary member.

It is another object of this invention to provide an analogue to digital converter having facile means for resetting the counter or a portion thereof to zero. Such reset mechanism is often desirable to counteract any possible missing of counts or injection of spurious counts during a counting cycle.

In accordance with these and other objects which will become apparent hereinafter, preferred embodiments of the present invention will now be described with reference to the accompanying drawings wherein.

Figure 1:
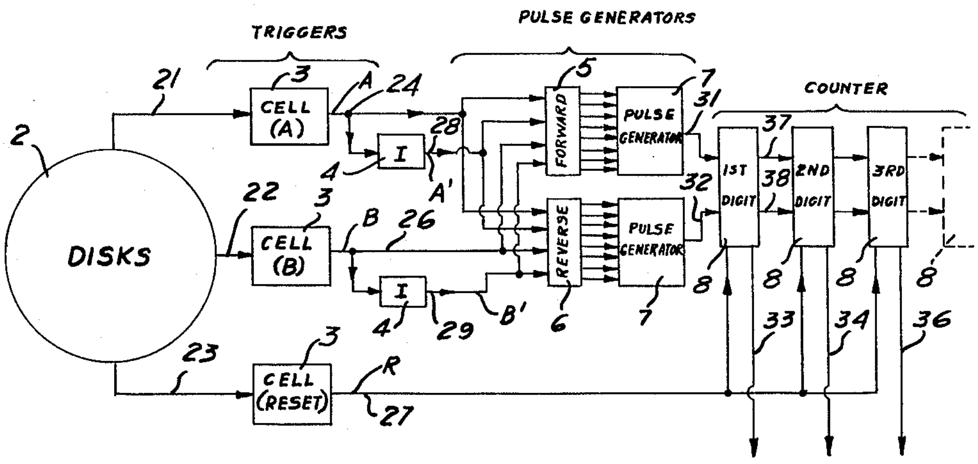
FIG. 1 is a schematic diagram showing the entire apparatus forming the present invention.
Figures 2, 2A, 3:
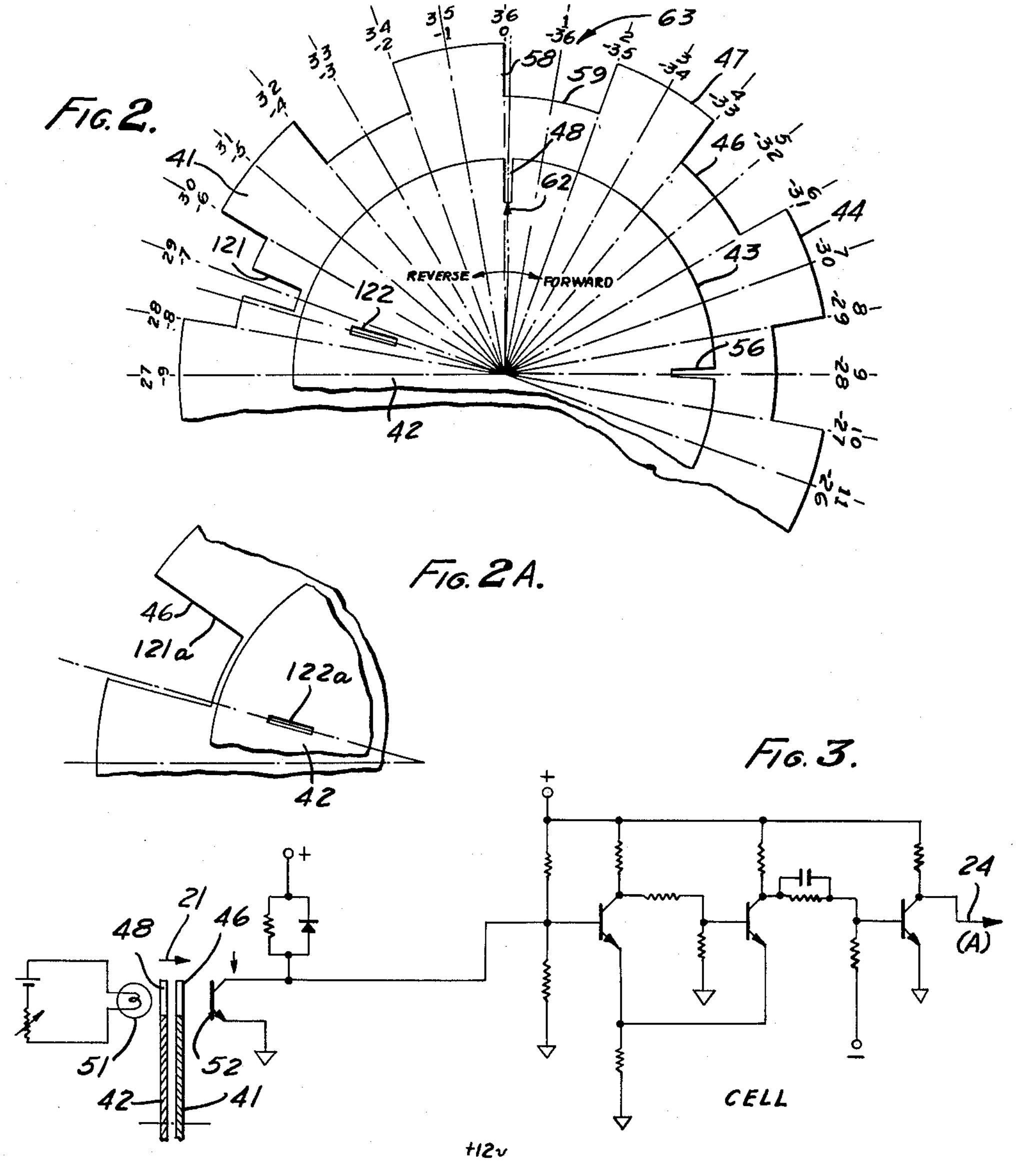
FIG. 2 is a stylized diagram showing the relationship between the disk which is mounted to the rotary member and the stationary disk, relative movement of the two disks producing the output that is ultimately recorded.
FIG. 2A is a fragmentary view showing a modification of a portion of the disk shown in FIG. 2.
FIGS. 3, 4, 5, 6, 7 and 8 are detailed diagrams of the corresponding numbered parts which are shown in block form in FIG. 1.

Referring to the drawings, and particularly FIG. 1, numeral 2 designates schematically a pair of disks shown in greater detail in FIG. 2. Either one of the disks is secured concentrically to a rotary member such as a shaft, whose position is to be indicated. The other disk is concentric with the shaft but stationary. The disk 2 delivers three output signals at 21, 22 and 23, respectively, as the shaft rotates. Each of these signals, which in this particular case are illustrated as light signals, is fed to a respective cell 3 shown in detail in FIG. 3.

Figure 4:
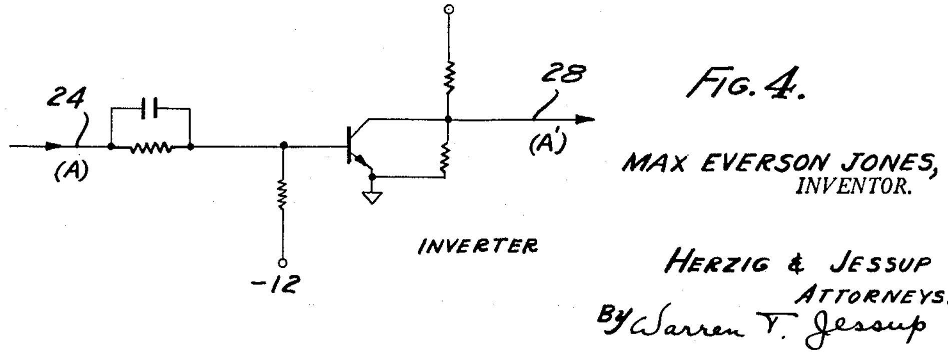

The square wave from cell 3 appearing at output terminal 24 will be called the A signal; that appearing from the second cell at the output terminal 26 will be called the B signal; and that appearing at the output terminal 27 will be called the R signal, this being the reset signal that occurs only once during each full revolution of the shaft. The A signal is inverted (reversed in polarity) in the inverter 4, shown in detail in FIG. 4, and appears at the output 28 as a signal A′. The B signal is similarly inverted to appear as signal B′ at the output terminal 29.

The disks 2 are so arranged that signals A and B are 90° out of phase, 360° representing the full periodicity from the leading edge of an A pulse or on signal until the next leading edge of an A pulse.

Figure 5:
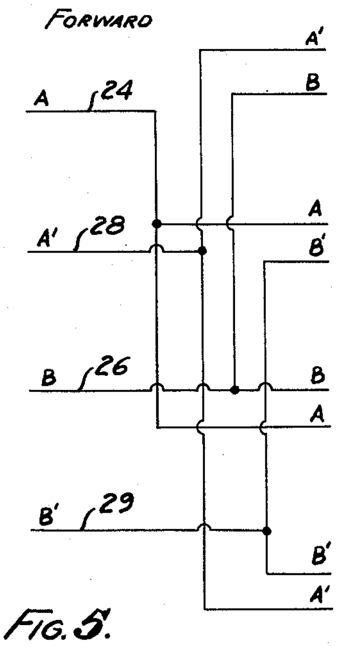
Figure 6:
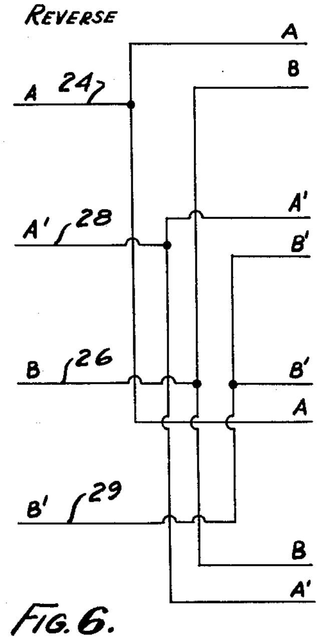

Each of the four signals A, A′, B and B′ is applied to a simple distribution network 5, shown in detail in FIG. 5 and also to a distribution network 6, shown in detail in FIG. 6. Numeral 5 represents the forward distribution network, because from it will be generated brief pulses that appear only when the shaft is rotating in a given direction (clockwise), which will be called the forward direction. Similarly, numeral 6 represents the reverse network in that from it are derived brief pulses which occur only when the shaft is rotating in the reverse (counter clockwise) direction. Networks 5 and 6 both feed to essentially identical pulse generator circuits 7, illustrated in detail in FIG. 7.

From the output 31 of the pulse generator 7 emerges a stream of brief pulses whenever the shaft associated with the disks 2 turned in the forward direction, and similarly at the output 32 there appears a succession of brief pulses whenever the shaft turns in the reverse direction. For each given angular increment of rotation of the shaft in the forward direction, a pulse appears at 31, and similarly in the reverse direction, a pulse appears at 32.

Figure 8:
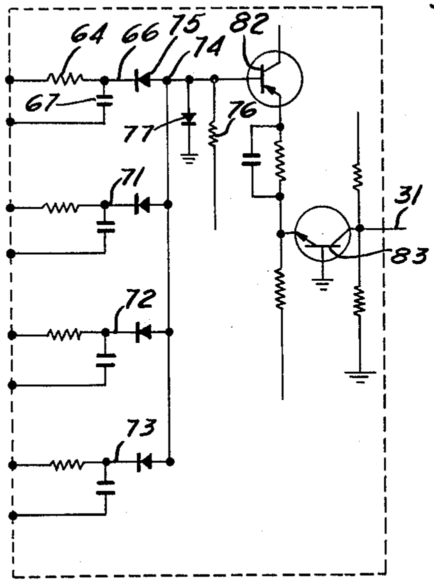

The forward and reverse pulses are applied to a series of binary counters 8, shown in detail in FIG. 8, each representing a given binary condition. Three such digital sections 8 are illustrated in FIG. 1, so that this particular counter is capable of counting only up to 8, it being understood however, that in an actual installation a larger number of counting sections will be employed, one for each power of 2 that it is desired to include in the counting circuit.

The signal at the output 33 of the first digit or section 8 is binary in character and for convenience will be referred to as either off or on. The counter registers zero when each of the outputs 33, 34 and 36 is off. The first forward pulse at terminal 31 causes the signal at output 33 to go on, denoting the first number in the count. The next forward pulse at the terminal 31 causes the output at 33 to go off, and through the connection 37 causes the output at 34 to go on. This represents the second count of the counter, in typical binary fashion. A reverse pulse at the terminal 32 simply returns the counter to the condition it was in prior to the last forward pulse, and thus in effect, subtracts a pulse from the counter. Reverse pulses are transferred from the first digit circuit to the next by a connection shown at 38. The counter shown generally at 39 thus serves to receive and give a current indication of the algebraic sum of forward and reverse pulses applied to it through the terminals 31 and 32.

When the shaft driving one of the disks 2 has made a complete revolution, i.e., 360 physical degrees, the counter 39 should reside at exactly the number of counts which the disks at 2 have put out. However, in actual practice, it is possible that pulses may have been added or dropped, so that the count recorded at 39 is not actually a complete revolution of the shaft. For this purpose there is provided the reset output 23, which is applied to all of the counter sections 8 simultaneously, and serves to reset the entire counter to its zero indication.

The structure and operation of the apparatus illustrated schematically in FIG. 1 will now be described in detail with reference to the remaining figures.

Referring to FIG. 2, there is shown two juxtaposed coaxial disks 41 and 42. While the disk 42 has been shown schematically as being smaller than 41, this has been done for the sake of clarity of explanation. It is to be understood that the circumference 43 of the disk 42 is substantially coincident or aligned with the circumference 44 of the disk 41. One of the disks is stationary while the other is mounted to the shaft whose angular position is to be indicated. For purposes of illustration, it will be assumed that the disk 41 is stationary while the disk 42 is mounted to the shaft. The disk 41 is provided with a series of substantially equally spaced notches 46, the angular distance 47 between notches 46 being substantially the same as the angular width of the notches themselves. At substantially the same radius as the notches 46, the rotating disk 42 is provided with a single narrow slit 48 which thus is successively in and out of registry with the notches as the disk 42 rotates.

As long as the slit 48 is in register with any portion of a notch 46, light is enabled to pass from a light bulb 51 (FIG. 3) on to a photo-transistor 52. In this way, the photo-transistor 52 puts out an electrical square wave in essentially on or off condition, depending on the position of registry of the slit 48 with respect to the several notches 46. The circuit of FIG. 3 is essentially a Schmitt trigger, which puts at its output 24 a discrete signal in either one of two conditions, on (positive), or off (negative). In the circuit of FIG. 3, whenever the illumination falling on the photo-transistor 52 is above a certain level, the Schmitt trigger is in one of its stable positions, such that the voltage of the output 24 is on, or positive. When the illumination drops below a certain level, the circuit flips over and the output 24 goes negative or off. In this way, there is no modular or in-between condition which might create an ambiguity in the output. Thus, even though the light passing from the bulb 51 may not shut on and off with the required sharpness, the Schmitt trigger circuit of FIG. 3 resolves this possible ambiguity with a sharp step function at the output 24. When the shaft rotates at substantially uniform angular velocity, the output at 24 is a substantially symmetrical series of square waves. During periods of acceleration or deceleration, the adjacent on-off blocks will not be "square," but the blocks will still be essentially "rectangular," i.e., the transient time will be substantially zero.

Reverting now to FIG. 2, it will be seen that the disk 42 is provided with another slit 56, which also registers with the notches 46 in the stationary disk 41. Defining clockwise rotation of the disk 42 as forward, and further defining the angular movement of the slit 48 from one leading edge of a notch 46 to the next succeeding leading edge of a notch, as 360°, the slit 56 is so placed that its light output is also essentially a square wave leading the output of the slit 48 by 90°. Thus there appears at the output 26 of the Cell (B), the B output which is a square wave leading the square wave A by 90°. The A wave is inverted in the circuit shown in FIG. 4 to produce its negative or reciprocal A′ on the output terminal 28. The B wave is similarly inverted to produce its negative or reciprocal B′ on the output terminal 29 (FIG. 1).

Figure 9:
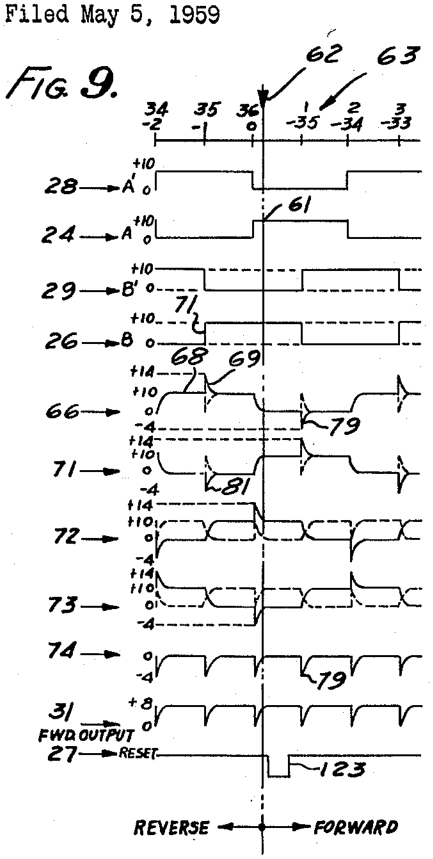
FIG. 9 is a diagram showing progressive wave forms of voltages at various points in the circuit.

In FIG. 9, the wave forms appearing at the several terminals 28, 24, 29 and 26 are plotted against angular positions of the disk 42. When the disk 42 occupies the particular position shown illustratively in FIG. 2, it will be seen that the slit 48 has just passed the leading edge 58 of the notch 59, assuming rotation in the forward direction. Light has thus just fallen on the phototransistor 52 of Cell (A) and the signal at terminal 24 has just gone on as shown at 61 in FIG. 9. The arrow 62 represents the index indicating the relative position of the disk 42 with respect to the stationary disk 41, which has been provided with an arbitrary scale as shown by the numerals 63. In the embodiment illustrated, the scale has been chosen to have thirty-six evenly spaced angular positions for the index arrow 62 which, in the forward direction, has just passed position zero (congruent with position 36). For cross-reference purposes, the numerals 63 and the arrow 62 are repeated in FIG. 9.

Figure 7:
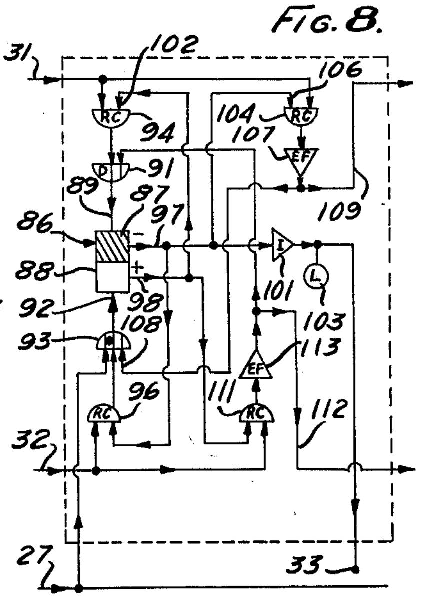

The four signals A, A′, B and B′ are suitably distributed by the simple network shown in FIG. 5 and then applied to the forward pulse generator illustrated in FIG. 7. For the forward pulse generator it will be seen that the A′ signal is applied through a resistor 64 to a terminal 66 and the B signal is differentiated in a capacitor 67 and then applied to the terminal 66, at this point being added to the A′ signal. The net result is shown in FIG. 9, where the base of the signal 68 is the result of the A′ input while the peak 69 results from the differentiation of the positive going front 71 of the B signal. In similar manner, the four square waves are segregated by the FIG. 5 circuit so as to combine A and B′, B and A, and B′ and A′, resulting in the respective output signals at 71, 72 and 73.

The signal at 66 is applied to a common terminal 74 through a negatively poled rectifier 75. The terminal 74 is biased positively through a resistor 76. A rectifier 77 serves as a return path for the bias without attenuating negative signals, as will now be explained. Positive signals on the terminal 66 are isolated from the terminal 74 by the rectifier 75. Negative signals, however, are felt at terminal 74 by transition through the rectifier 75. As seen in FIG. 9, the voltage or signal at 66 does not go negative until the short peak or pulse 79 is created at position 1. Thus at position 1, a sharp negative pulse is applied from the combined signals A′—B through the rectifier 75 to the terminal 74, this being the pulse 79 shown in FIG. 9. In similar manner, each of the other pairs of input terminals in FIG. 7 produces a sharp negative pulse once during each cycle, these pulses being spaced from each other by 90° as shown in FIG. 9. More specifically, the signal at 71 goes negative (and hence appears at 74) only at 81 in FIG. 9. This occurs at position −1, which is also position 35. In similar manner, the signal at 72 goes negative only at position 2, and 73 goes negative only at position 0. It is to be understood of course, that the signals at each of the terminals, 66 for example, repeats itself every cycle. The net result is a series of evenly-spaced negative pulses as shown at 74 in FIG. 9. Four pulses, evenly spaced, appear for each cycle, and hence for each notch 46 and tab 47 in the stationary disk 41.

The pulses appearing at 74 are amplified in the transistors 82 and 83 and appear amplified at the terminal 31 as shown in FIG. 9.

When the disk 42 rotates in the reverse direction, none of the terminals 66, 71, 72 or 73 ever goes negative. This may be seen by studying the dotted wave forms in FIG. 9, which represent the respective signals at the indicated terminals for reverse rotation of the disk 42.

The reverse pulse generator 7 of FIG. 1 is identical to the forward pulse generator, but the distribution of signals to its input terminals is different, being controlled by the network of FIG. 6, rather than the network of FIG. 5. The result is that the reverse pulse generator applies to its output terminal 32 a series of negative going pulses whenever the disk 42 rotates in a reverse or counterclockwise direction, and puts out no pulses for forward or clockwise rotation.

The pulses, both forward and reverse, are counted and indicated in the counter 39, as will now be described in conjunction with FIG. 8. Each counter section 8 has a bi-stable flip-flop 86 having interlocked sides or sections 87 and 88. Each side is capable of assuming either of two stable positions or conditions, known variously as true or false, conducting or non-conducting, positive or negative. For ease of reference, the first nomenclature will be adopted. When one section is true, the other is false and vice versa. One of the conditions represents a sensitive condition, such that upon receipt of a pulse the circuit is flipped over to the other condition. It will be assumed that the false condition represents the sensitive condition. The input terminal 89 of the side 87 is fed from a diode OR gate 91 while the input 92 of the side 88 is fed through another diode OR gate 93. Forward pulses from the terminal 31 are applied through an RC AND gate 94 to the OR gate 91 and thence to the side 87. Similarly, reverse pulses from the terminal 32 are applied through another RC AND gate 96 to the OR gate 93 and thence to the side 88.

When either side of the flip-flop 86 is false, no output appears at its respective output terminal 97 or 98. At the start, i.e., when the counter registers zero, the side 87 is false and the side 88 is true. This means that no output signal is being applied to the output terminal 33 of the counter circuit 8 through the inverter amplifier 101. It also means that the gate 94 is enabled, since true signal is being applied from the output terminal 98 to the gating terminal 102 of the AND gate 94. At zero each of the counting stages 8 is in the same condition. When a forward pulse appears at the terminal 31, it passes through the AND gate 94 by virtue of the enabling signal applied thereto from the output 98 of the flip-flop 86. It then passes through the OR gate 91, hits the side 87 of the flip-flop 86, which, being in false condition, is sensitive to a flipping pulse and flips over to the other condition. This places an output signal at 97 and removes the signal from 98. The output signal at 97 passes through the inverter amplifier 101, causes the light 103 to light up, and applies an output voltage to the output terminal 33. The succeeding stages 8 remain unaffected. In this condition of the counter 39, the indication is 1 (or the first numeral), in the binary or dyadic nomenclature.

Flipping of the flip-flop 86 has now disabled the AND gate 94 but has enabled the gate 96 for reception of a reverse pulse, should the next pulse be a reverse one. If the next pulse is, in fact, reverse, it passes from the terminal 32 through the gates 96 and 93, hits the sensitized side 88 and causes the flip-flop to return to its former condition. This removes the output from 33 and places the counter back at zero.

If, however, the next pulse is another forward pulse at terminal 31, it finds its way to the AND gate 104, which is enabled by virtue of the true signal at the terminal 97 and hence at the terminal 106 of the gate 104. This pulse thus passes through the gate 104, through the emitter follower 107, thence around to the pulse input terminal 108 of the OR gate 93 where it strikes the now sensitized side 88 and causes the flip-flop to flip over. The pulse from the emitter follower 107 also goes through the lead 109 over to the second stage or digit, where it causes the second stage to flip over and produce a positive output signal on the second stage output. Flipping of the flip-flop 86 in the first stage, in the meantime has returned its output to zero, the counter thus stands at the second numeral in the binary notation.

Reception of a reverse pulse at the terminal 32, while the AND gate 96 is disabled by virtue of a false condition in the side 87, acts in a similar way, in that the reverse pulse is now shunted to the AND gate 111 which is enabled by virtue of the true condition of the side 88. This pulse is fed to the OR gate 91 to hit the false side of the flip-flop and cause it to flip over, and is also fed through the reverse pulse output lead 112 to the next succeeding counter stage.

It will be noted in passing that the circuit is quite capable of accepting and properly indicating reverse pulses, even when in the zero condition. Specifically, when in this condition, it will be recalled that each of the upper halves 87 is in the false or sensitive condition. Thus, as far as reverse pulses are concerned, the enabled gate is gate 111. A reverse pulse received in this condition, i.e., with the counter at 000, etc., passes through the gate 111, the emitter follower 113, and thence to the sensitive side 87 of the flip-flop 86, causing it to flip over and place an output pulse on the terminal 33. The reverse pulse passing through the gate 111 also travels through the lead 112 and thence to the reverse input side of the second stage, where the process is repeated. Thus a single reverse pulse appearing when the counter is in 000 (all zero) condition causes each of the stages to flip over to an output condition representing the maximum number possible in the complete counter 39. This is synonymous with —1. Thus the circuit can pass through zero going either forward or reverse.

A description of the reset operation will now be set forth. As noted hereinbefore, it is sometimes advisable to provide for the possibility that the counter 39 has failed to pick up a count or has injected an extra count or so because of noise. It is thus desirable to provide that once during each full revolution of the shaft or other rotary member the counter is brought to the zero position, where it would be anyway if the count has been done accurately. In the specific instance, this corresponds to position zero (or 36) for the disks illustrated in FIG. 2.

To this end, the stationary disk 41 is provided with an extra notch 121 at a radius smaller than that of the notches 46. At a registering radius the disk 42 is provided with a slit 122, which is energized with light once each revolution of the disk 42 during the time that it is in registry with the wider notch 121. The notch 121 and slit 122 are so positioned that the reset pulse occurs midway between the 0 and 1 position of the disk 42. This is true whether the disk is moving in forward or reverse rotation, in the latter case the only difference being that the reset pulse occurs as the disk moves from position 1 to 0. The resultant pulse of light is applied to a cell 3 as shown in FIG. 1, and appears at the output 27 as a square wave similar to the signals A and B except that it is considerably shorter because of the narrower angular width of the notch 121. This pulse is shown 123 in FIG. 9.

Referring to FIG. 8, the reset pulse 123 is applied through the terminal 27 to the lower side 88 of the flip-flop 86. If this side is sensitive, i.e., false, it will flip the circuit 86 over and remove output signal from the terminal 96, thus placing the output at 33 in the 0 condition. If the side 88 is in the true condition, the reset pulse at 92 will have no effect, but it will be unnecessary because the output 33 already registers zero.

It will be noted that the reset pulse from the terminal 27 is applied simultaneously and in parallel to all of the stages 8 of the counter 39, so that all stages or digits are simultaneously turned to zero by the reset action.

Figure 9A:
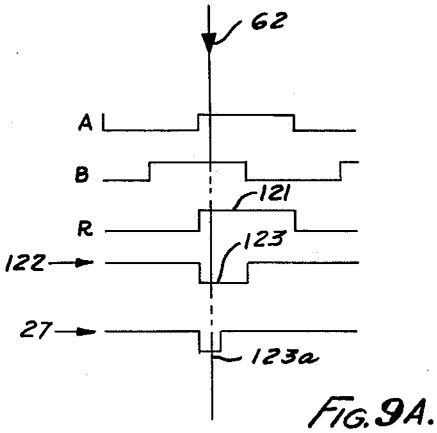
FIG. 9A is a diagram of wave forms existing in connection with a modified form of the invention.

Resetting as described above has the advantage of minimizing the circuitry required but has the disadvantage that the reset notch 121 must be quite narrow. When it is recalled that FIG. 2 is simply exemplary of the notches 46 and that in practice much narrower notches are used, it will be seen that the point is soon reached where the still narrower notch 121 becomes so small that this operation may become undependable. In this event, an alternative means of creating a reset pulse is shown in FIGS. 1A, 2A and 9A.

Referring to FIG. 2A, the reset notch 121*a* is formed as a full angular width continuation of a normal notch 46. In this way, the basic reset pulse is as wide as the A and B pulses and coincides in phase with one of the A pulses, since the slit 122*a* on the disk 42 is positioned so as to coincide in phase with the A slit 48.

Figure 1A:
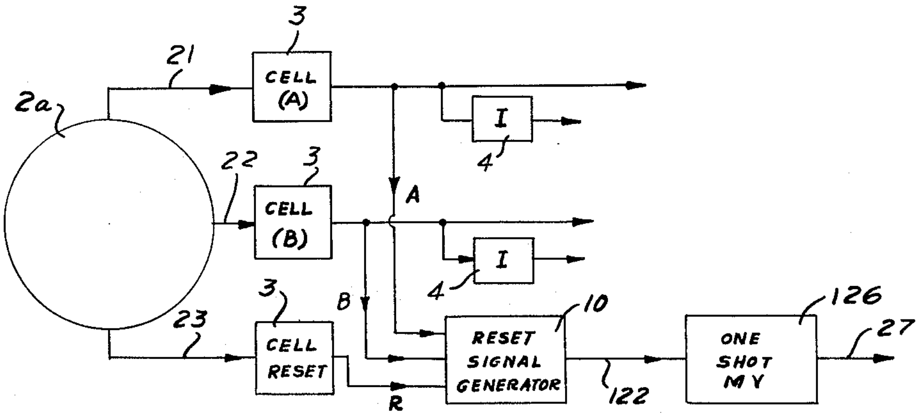
FIG. 1A is a portion of the schematic diagram of FIG. 1 modified in accordance with a certain alternative form of the present invention.
Figure 10:
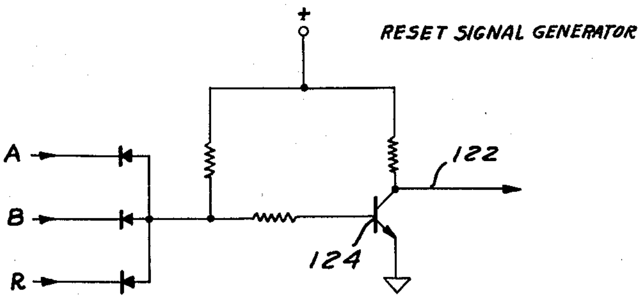
FIG. 10 is a circuit diagram giving the details of the block numbered 10 in FIG. 1A.

Referring to FIG. 1A, it will be seen that the full width reset pulse 121 (FIG. 9A) emerges from the Cell (reset) 3 and then is combined with the A and B pulses in a reset signal generator 10 illustrated in detail in FIG. 10. The circuit of FIG. 10 is basically a diode AND gate which produces an output pulse only when A, B and R are all simultaneously positive. This pulse appears on the output terminal 122, inverted as shown at 123 (FIG. 9A), by virtue of inversion in the transistor amplifying stage 124.

The square wave 123 triggers a one-shot multivibrator 126, which produces an abbreviated output pulse 123*a* (FIG. 9A) on the terminal 27. This pulse is then applied to all of the counter-sections 8 simultaneously in the manner described hereinbefore.

While the reset pulse 123*a* may, by virtue of some delay in the multivibrator 126, come on or reach its full excursion at some time after the onset of the forward pulse occurring at position 0 (FIG. 9), it in any event, endures appreciably beyond the disappearance of the forward pulse at position 0, and therefore its effect is felt on the flip-flops of all the counter digit circuits 8 in the interval from position 0 to position 1. In this manner, it serves to reset the counter to zero in the transit between 0 and 1 just as in the first embodiment described hereinbefore.

When the disk is moving in the reverse direction, the pulse 123 likewise occurs in the transit from 1 to 0, although in this case, the occurrence of the pulse is shortly after the reverse pulse at position 1 has been injected into the counter-circuit 39.

The initial creation of the A, B and R pulses has been illustrated herein as being done by light pulses between notches or slits in registering disks. This method has certain advantages in that it places minimum frictional loading on the shaft or other rotary member. It is to be understood, however, that the basic A, B and R pulses may be initially generated by any type of pick-up means such as physical brushes, or capacitive or magnetic pulsing of members carried by registering disks, one stationary and the other rotating.

While the instant invention has been shown and described herein in what is conceived to be the most practical and preferred embodiments, it is recognized that departures may be made therefrom within the scope of the invention which is therefore not to be limited to the details disclosed herein but is to be afforded the full scope of the claims.

What is claimed is:

1. Pulse-forming circuit for creating forward pulses and backward pulses from phase-displaced block waves picked off from rotating elements comprising: means for effecting, from rotation of an element, a first block wave, a second block wave directly out of phase with said first wave, a third block wave lagging said first wave by substantially ninety cyclic degrees, and a fourth block wave directly out of phase with said third wave; a forward pulse generator comprising: output circuit means, means for differentiating said fourth wave and adding it to said first wave, means for detecting said first wave and said differentiated fourth wave when in a given identical polarity and applying the detected sum to said output circuit means, means for differentiating said third wave and adding it to said second wave, means for detecting said differentiated third wave and said second wave when in a given identical polarity and applying the sum to said output circuit means, means for differentiating said second wave and adding it to said fourth wave, means for detecting said differentiated second wave and said fourth wave when in a given identical polarity and applying the sum to said output circuit means, means for differentiating said first wave and adding it to said third wave, means for detecting said differentiated first wave and said third wave when in a given identical polarity and applying the sum to said output circuit means, thereby to produce at the output of said forward pulse generator four pulses for each complete cycle of said block waves, whenever the rotating element is rotating in a forward direction; a reverse pulse generator comprising output circuit means, means for differentiating said fourth wave and adding it to said second wave, means for detecting said differentiated fourth wave and said second wave when in a given identical polarity and applying the sum to said output circuit means, means for differentiating said third wave and adding it to said first wave, means for detecting said differentiated third wave and said first wave when in a given identical polarity and applying the sum to said output circuit means, means for differentiating said second wave and adding it to said third wave, means for detecting said differentiated second wave and said third wave when in a given identical polarity and applying the sum to said output circuit means, means for differentiating said first wave and adding it to said fourth wave, means for detecting said differentiated first wave and said fourth wave when in a given identical polarity and applying the sum to said output circuit means, thereby to produce at the output of the reverse pulse generator four pulses for each cycle of said waves, whenever the rotating element is rotating in a reverse direction.

2. Means for detecting the position of a rotary member comprising:

a first member and a second member mounted to rotate relative to one another in synchronism with said rotary member;

said first member having a plurality of circumferentially equi-spaced indicia, and said second member having a first index and a second index positioned to register with said indicia and being mutually phase-displaced 90° relative to the repetitive spacing of said indicia;

first sensing means coupled to said indicia of said first member and to said first index of said second member for producing a first periodic electrical signal;

first inverter means coupled to said first sensing means for producing a second periodic electrical signal in phase opposition to said first signal;

second sensing means coupled to said indicia of said first member and to said second index of said second member for producing a third periodic electrical signal phase displaced 90° from said first periodic electrical signal;

second inverter means coupled to said second sensing means for producing a fourth periodic electrical signal in phase opposition to said third signal;

binary counter circuit means having a pair of input terminals, a first for receiving forward counting pulses to cause said counter to count up and a second for receiving reverse counting pulses to cause said counter to count down;

first control circuitry coupled to said first and second sensing means and to said first and second inverter means for producing a first series of pulses only when the relative rotation of said first and second members is in a forward direction and coupled to said first input terminal of said binary counter circuit means for applying said first series of pulses thereto; and second control circuitry coupled to said first and second sensing means and to said first and second inverter means for producing a second series of pulses only when the relative rotation of said first and second members is in a reverse direction and coupled to said second input terminal of said binary counter circuit means for applying said second series of pulses thereto.

3. The detecting means defined in claim 2 in which said first member has at least one indice radially spaced from said circumferentially equi-spaced indicia, and in which said second member includes a further index radially disposed to register with said indice on said first member once for each complete cycle of relative rotation of said first and second members; and which includes further sensing means coupled to said indice and to said further index for producing a signal indicative of each such complete cycle of relative rotation; and electrical circuitry coupled to said further sensing means for producing a reset signal and to said binary counter circuit means for applying said reset signal to said binary counter circuit means to reset said binary counter after each such complete cycle of relative rotation.

4. The combination defined in claim 3 in which said last-named electrical circuit is further coupled to said first and second sensing means and is further responsive to said first and second period electrical signals for producing said reset signal.

5. The detecting means defined in claim 2 in which said first control circuitry includes output circuit means, means for differentiating said fourth signal and adding it to said first signal, means for detecting said first signal and said differentiated fourth signal when in a given polarity and for applying the detected sum to said output circuit means, means for differentiating said third signal and adding it to said second signal, means for detecting said differentiated third signal, and said second signal when in a given polarity and applying the sum to said output circuit means, means for differentiating said second signal and adding it to said fourth signal, means for detecting said differentiated second signal and said fourth signal when in a given polarity and applying the sum to said output circuit means, means for differentiating said first signal and adding it to said third signal, means for detecting said differentiated first signal and said third signal when in a given polarity and for applying the sum to said output circuit means, thereby to produce at said output circuit means for pulses for each complete cycle of said signals whenever said relative rotation is in a forward direction; and in which said second control circuitry includes second output circuit means, means for differentiating said fourth signal and adding it to said second signal, means for detecting said differentiated fourth signal and said second signal when in a given polarity and for applying the sum to said second output circuit means, means for differentiating said third signal and adding it to said first signal, means for detecting said differentiated third signal and said first signal when in a given polarity and for applying the sum to said second output circuit means, means for differentiating said second signal and adding it to said third signal, means for detecting said differentiated second signal and said third signal when in a given polarity and for applying the sum to said second output circuit means, means for differentiating said first signal and adding it to said fourth signal, means for detecting said differentiated first signal and said fourth signal when in a given polarity and for applying the sum to said second output circuit means, thereby to produce in said second output circuit means four pulses for each cycle of said signals whenever said relative rotation of said first and second members is in a reverse direction.

References Cited in the file of this patent

UNITED STATES PATENTS

| | | |
|---|---|---|
| 2,436,178 | Rajchman | Feb. 18, 1948 |
| 2,656,106 | Stabler | Oct. 20, 1953 |
| 2,733,430 | Steele | Jan. 31, 1956 |
| 2,734,188 | Jacobs | Feb. 7, 1956 |
| 2,747,797 | Beamont | May 29, 1956 |
| 2,765,459 | Winter | Oct. 2, 1956 |
| 2,846,594 | Pankratz | Aug. 5, 1958 |
| 2,881,333 | Pickard | Apr. 7, 1959 |